Dec. 12, 1950 L. A. BIEHLER 2,533,710
INTEGRATING MECHANISM
Filed Feb. 2, 1949 4 Sheets-Sheet 1

INVENTOR.
LOUIS A. BIEHLER.
BY Ward, Crosby & Neal
ATTORNEYS.

Dec. 12, 1950 L. A. BIEHLER 2,533,710
INTEGRATING MECHANISM
Filed Feb. 2, 1949 4 Sheets-Sheet 2

INVENTOR.
Louis A. Biehler
BY Ward, Crosby & Neal
ATTORNEYS.

Dec. 12, 1950      L. A. BIEHLER      2,533,710
INTEGRATING MECHANISM
Filed Feb. 2, 1949      4 Sheets-Sheet 3
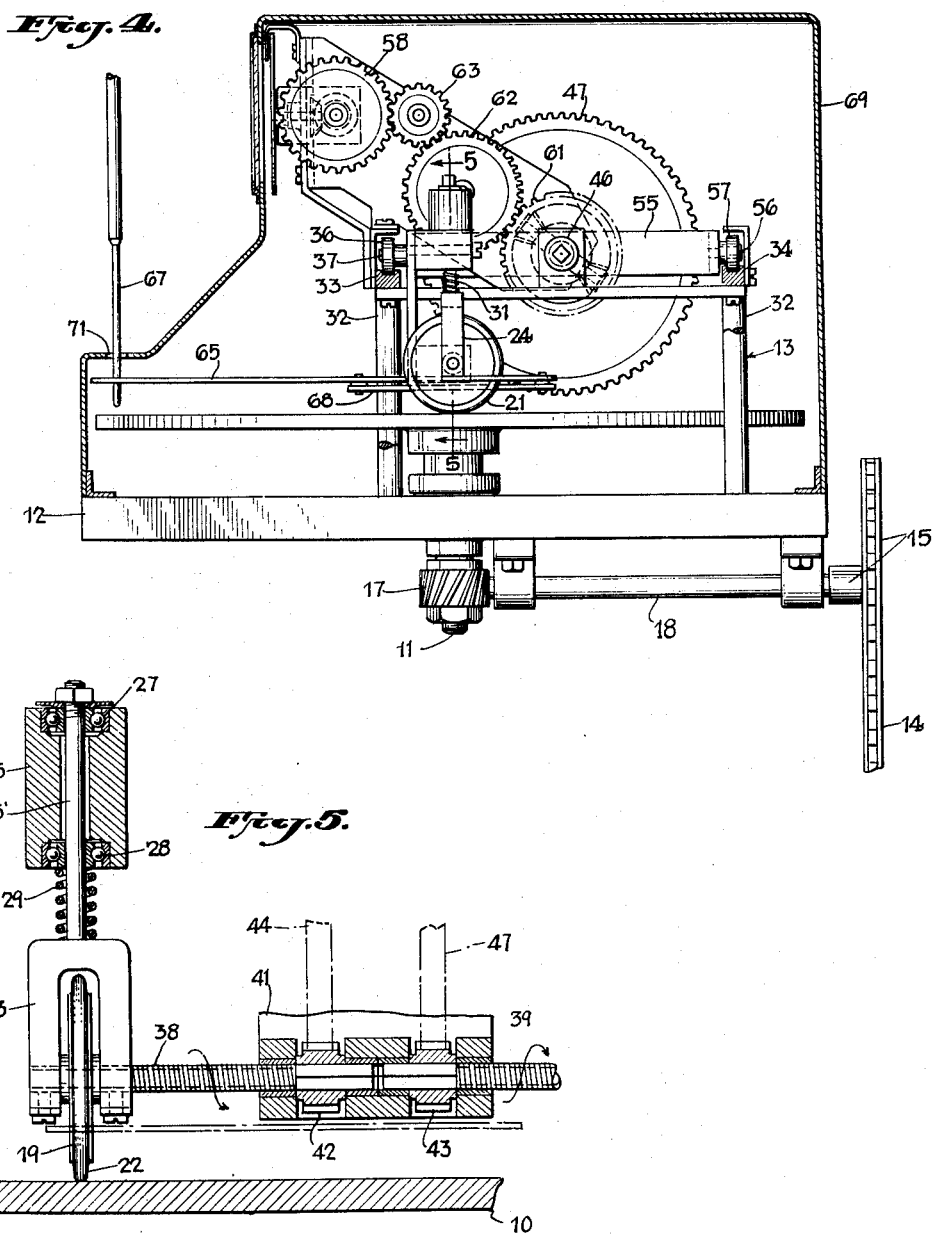
INVENTOR.
LOUIS A. BIEHLER.
Ward, Crosby & Neal
ATTORNEYS.

Dec. 12, 1950 L. A. BIEHLER 2,533,710
INTEGRATING MECHANISM
Filed Feb. 2, 1949 4 Sheets-Sheet 4

INVENTOR.
LOUIS A. BIEHLER
BY Ward, Crosby & Neal
ATTORNEYS

Patented Dec. 12, 1950

2,533,710

UNITED STATES PATENT OFFICE 2,533,710

INTEGRATING MECHANISM

Louis A. Biehler, Stanhope, N. J., assignor to Sintering Machinery Corporation, Netcong, N. J., a corporation of New Jersey Application February 2, 1949, Serial No. 74,219

6 Claims. (Cl. 74—691)

This invention relates to integrating mechanisms useful, among other possible purposes, for continuously measuring the weight of material transported on a conveyor.

In certain types of mechanisms for this purpose, it is the practice to employ a disc rotated at a speed proportional to the rate of travel of the conveyor belt carrying the material to be weighed, which rate of travel is one of the quantities to be integrated along with the varying weight of material on the conveyor as it passes a given point. The disc operates to rotate one or more wheels frictionally engaging the disc and whose position thereon is caused to vary in accordance with changes in weight of the material transported on the conveyor belt. A change in position of the wheels on the disc causes changes in the relative speeds thereof and the difference in speeds is imparted through a differential gear assembly to a registering device which yields a visual indication thereof in terms of weight.

In order to render the mechanism extremely sensitive to small load changes on the conveyor belt, it is desirable to provide means to turn the axes of the wheels in a plane perpendicular to the axis of rotation of the disc in response to load changes whereby the rotative influence of the disc on the wheels may be employed to move them radially thereof.

The present invention is directed to improved mechanisms of this type, having a high degree of sensitivity, accuracy and dependability and which are also relatively economical to manufacture.

In accordance with the invention, preferably a pair of wheels are disposed on opposite sides of the axis of rotation of the disc, the wheels being caused to rotate in opposite directions at the same speed when they are positioned equidistant from the axis of rotation of the disc. Each wheel is connected to a differential gearing assembly by means of a coil spring flexible shaft. A lever is so mounted as to be pivotally moved in response to changes in weight of the material carried by the conveyor belt and thereby cause one of the wheels to move radially of the disc, the other wheel being caused to move with the first wheel by the provision of an interconnecting link, and so that as one wheel is moved radially outwardly of the disc, for example, the other will be moved an equal distance radially inwardly. The provision of the flexible shaft coupling the wheels to the differential gearing asembly allows the wheels to be skewed on the disc in order to facilitate the radial movement thereof and increase the sensitivity of the mechanism to small load changes. A horizontal guideway is provided above the disc to carry the differential gearing assembly and to control the radial movement of the wheels.

The invention resides in the novel combinations and arrangements of parts as hereinafter described in connection with the accompanying drawings which form a part of the specification and in which:

Fig. 4 is a side view of the device of Fig. 1;

Fig. 5 is a vertical sectional view taken substantially along the line 5—5 of Fig. 4;

Figure 1:
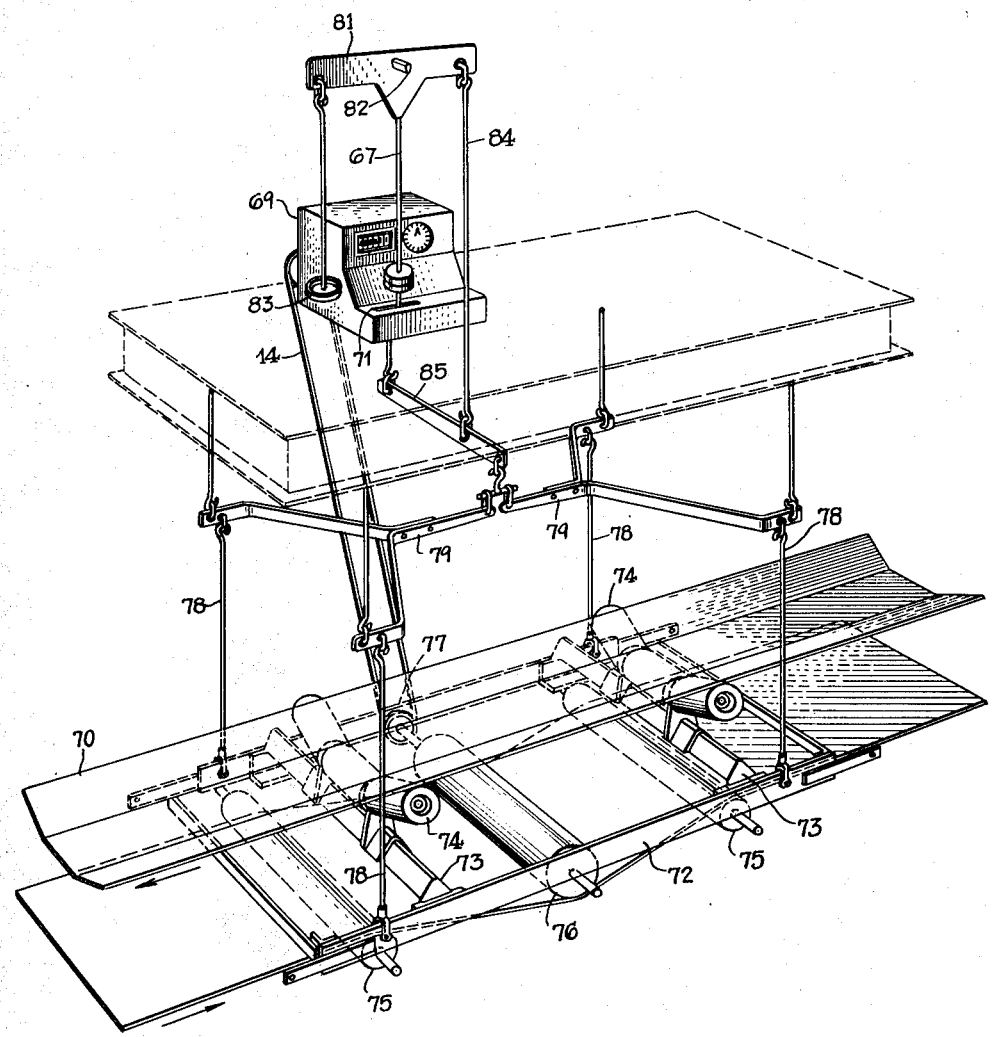
Fig. 1 is a perspective view of a conveyor scale arrangement with which the invention may be used for ascertaining the weight of material transported on the conveyor associated therewith.

Referring now to the drawings and more particularly to Figs. 2-5 thereof, 10 designates a disc rotatable about a vertical shaft 11 supported in a suitable bearing in a horizontal member 12, the latter also carrying a supporting structure indicated generally at 13 for other parts of the mechanism. Power is supplied to the vertical shaft 11 by means of a sprocket chain 14 and a sprocket wheel 15 which carries a worm wheel 16 on shaft 18 adapted to drive a worm gear 17 keyed to the shaft 11. The sprocket chain 14 is also connected to be driven in a manner hereinafter to be described from a conveyor belt so that the speed of rotation of the disc varies as the rate of travel of the conveyor belt which is one quantity to be integrated.

Figure 3:
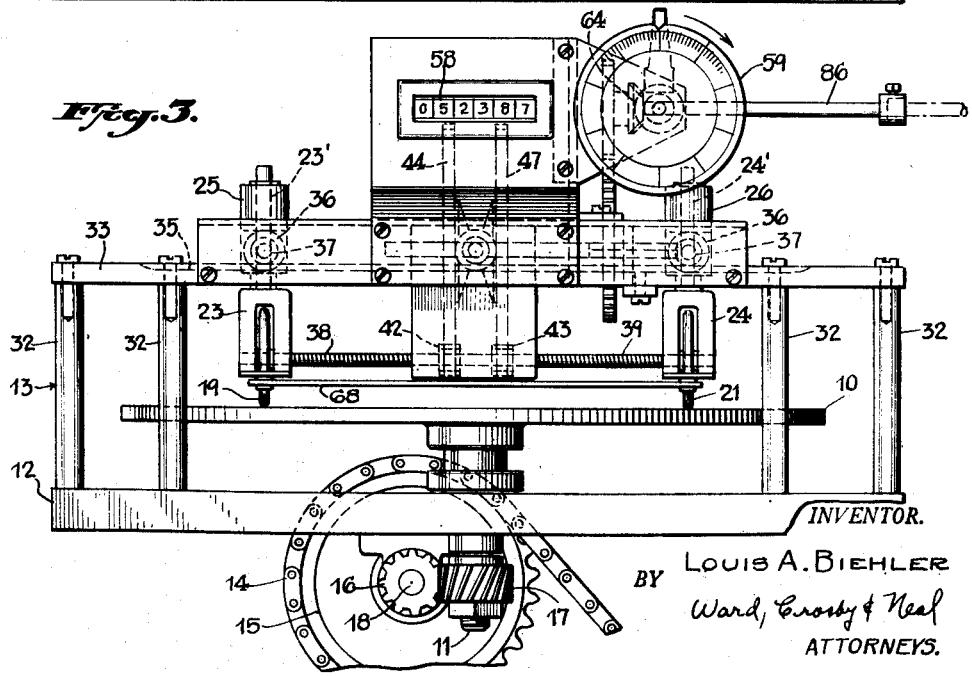
Fig. 3 is a front elevational view of the device of Fig. 1.
Figure 7:
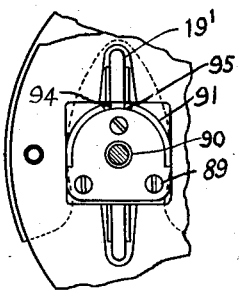
Fig. 7 is a horizontal fragmentary sectional view taken along the line 7—7 of Fig. 6.

Wheels 19 and 21 are respectively disposed on opposite sides of the vertical shaft 11 and frictionally engage the disc 10, each wheel preferably being provided with a friction band or bead 22, as is shown in Fig. 5. Each wheel is rotatably mounted in yokes 23 and 24, respectively, the yokes in turn having spindles 23' and 24' slidably and rotatably mounted within housings 25 and 26, having ball bearings 27 and 28, Fig. 5, disposed therein. Springs as at 29 are disposed intermediate the housings and yokes in order to normally maintain the wheels in frictional engagement with the disc. A carriage assembly is mounted on the vertical supporting members 32 of the structure 13 and comprises horizontal guideways 33 and 34, each being provided with an elongated recessed portion 35. The front side of such carriage, Fig. 3, is supported on rollers 36 rotatable about shafts 37 carried in the housings 25 and 26, respectively, the rollers being adapted to work within the recessed portion of guideway 33 to control the movement of the wheels 19 and 21 radially of the disc.

The wheels 19 and 21 are provided with flexible shafts indicated at 38 and 39, respectively, mounted for rotation with the wheels and separately journaled within a suitable housing 41. Carried on the opposite ends of the shafts and within this housing are spur gears indicated at 42 and 43. Spur gear 42 is adapted to mesh with a large gear 44 freely disposed on a hollow shaft 45 within which is disposed an output shaft 46. Spur gear 43 is adapted to mesh with large gear 47, also free to rotate about the shaft 45, the two large gears forming a part of a differential gear assembly indicated generally at 48. Beveled gears 49 and 51 are carried by and rotatable with large gears 44 and 47, respectively, with additional beveled gears 52 and 53 being disposed on opposite sides of the shaft 45 and meshing with beveled gears 49 and 51, as is clearly shown in Fig. 2. The beveled gears 52 and 53 are mounted on a shaft 54 to drive the output shaft 46 when a differential rotative movement exists between the two large gears 44 and 47.

The hollow shaft 45 and output shaft 46 disposed therein are supported by a rectangular framework 55, on the rear end of which is disposed a shaft 56 carrying a roller 57 adapted to work within the recessed portion of the guideway 34, whereby the output shaft together with the differential gear assembly may freely move horizontally with the wheels 19 and 21 above the disc.

A visual speed indicator 59 and a revolution counter 58 are provided to show the variations in the weight of material carried by the conveyor belt from moment to moment and the integrated weight thereof, respectively, which weight variations comprise the other quantity to be integrated. The speed indicator 59 is driven by the output shaft 46 by means of gear 61 keyed to the shaft and intermediate gears 62 and 63, Fig. 4. The revolution counter is driven from the speed indicator by means of a suitable gearing arrangement indicated at 64, Fig. 3.

Figure 2:
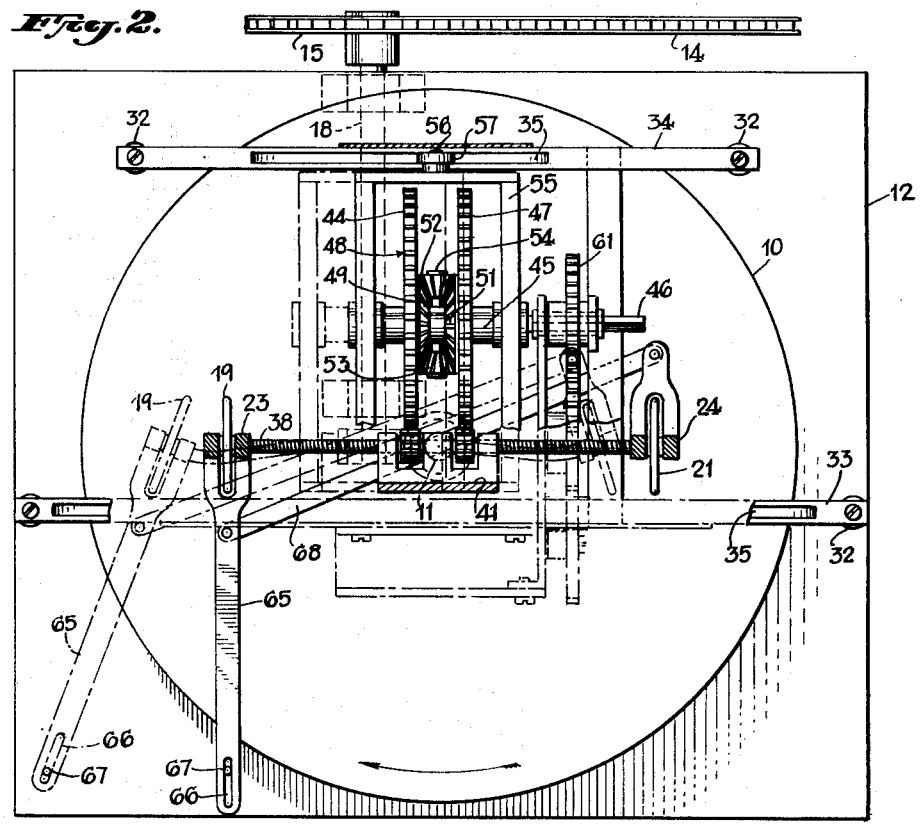
Fig. 2 is a top plan view of the device of the present invention according to the preferred embodiment thereof.

Referring now particularly to Fig. 2 of the drawings, one end of a lever 65 is rigidly secured to the yoke for wheel 19 and is disposed within a plane parallel to the plane of the disc. The other end of the lever is provided with a slot-like opening 66 within which is disposed, in vertical relation therewith, a beam lever 67 pivotally mounted for movement in response to load changes on the conveyor belt in a manner hereinafter to be described. In order that the positions of wheels 19 and 21 will be skewed concurrently in opposite directions in response to load changes, a connecting link 68 is provided between yokes 23 and 24. The disc, wheels and differential gear assembly are disposed within a suitable housing 69 carried on the supporting member 12 and provided with an elongated opening 71 to permit pivotal movement of the beam lever 67.

Fig. 1 of the drawings shows a conveyor scale device suitable for use with the mechanism of the present invention and is described herein merely for the purpose of more clearly illustrating one example of how the invention may be used, the scale device forming no part of the invention.

The scale device comprises a rectangular framework 72 having cross members 73, each adapted to carry a troughing idler 74 over which the conveyor belt 70 carrying the material to be weighed is to pass. On the return, the conveyor belt passes over bending idlers 75 carried by the framework to positively engage a driving roller 76. It is from this driving roller that power may be supplied to disc 10 by way of sprocket wheel 15 and sprocket chain 14 which engages another sprocket wheel 17 mounted for rotation with the driving roller 76. The framework 72 is suspended by means of rods 78 connected to levers 79. A pendulum type beam 81 is fulcrumed about knife edge 82 and is provided with a balancing weight pan 83 at one end thereof. Lever 84 hangs from the other end of the pendulum beam and supports a shelf lever 85 which in turn is connected at one end of each of the main levers 79. The beam lever 67 is formed integrally with the pendulum beam at the center thereof and passes through the mechanism housing 69 to engage in the slot 66 of lever 65 (Fig. 2).

The operation of the integrating mechanism will now be described. With no material being carried on the belt between the troughing idlers, the beam lever 67 is positioned substantially vertically, as shown in Fig. 1, and the wheels 19 and 21 are disposed on opposite sides of the axis of rotation of the disc equidistantly therefrom. In this position, the wheels rotate at the same speed but in opposite directions, whereby the large gears 44 and 47 are caused to rotate at the same speed in opposite directions and no rotative movement is imparted to the output shaft 46. When a load is applied to the belt between the troughing idlers, the beam lever will be pivotally moved about the knife edge 82. When this occurs, lever 65 and wheel 19 are skewed about an axis parallel to the axis of rotation of the disc, the wheel 21 also being similarly but oppositely skewed by reason of link 68 interconnecting the wheel yokes. This skewing movement is made easily possible by reason of the flexible spring shafts coupling the wheels to the differential gear assembly.

The character of the movement of the wheels in response to load changes on the conveyor belt is indicated (with some exaggeration) in dotted outline in Fig. 2 of the drawings. The skewing of the lever and wheels causes the latter to move radially of the disc, whereby the mechanism as a whole is rendered extremely sensitive to load changes. That is, the force exerted on the wheels by the beam lever in response to load changes is not materially relied upon to variably position the wheels on the disc but rather is employed to skew lever 65 to predetermine the repositioning of the wheels, the rotative influence of the disc being utilized to move the wheels when skewed to their new positions determined by lever 65.

Assuming that the wheels have first been moved to substantially the positions shown in dotted outline in Fig. 2, it will be understood that they will then come into substantially parallel positions, under the influence of the rotating disc, after reaching their new positions. The change in the positions of the wheels will result in one wheel rotating at a greater speed than the other since one will be disposed nearer the periphery of the disc and the other nearer the axis of rotation thereof. When this occurs, the differential gearing will cause rotation of the output shaft and operation of the indicators. Any further changes in the load carried by the conveyor will cause the beam lever to move in one direction or the other selectively in accordance with an increase or decrease in load weight to thereby position the wheels on the disc in a manner to reflect the load change in the speed of rotation of the output shaft.

It will be apparent that the connection of the wheels 19 and 21 to the differential by means of flexible shafts, permits the wheels to be readily skewed by amounts accurately in proportion to even very slight changes in the load being weighed, since the skewing is brought about without any relative slidable movement between parts which might cause varying frictional resistance to movement. And as soon as the wheels are skewed, the force of the rotating disc on the wheels tending to cause the wheels to track around the disc circumferentially, will provide the necessary power to move the carriage to the desired new position and, therefore, the movement of the greater part of the mechanism is caused by power from the disc without interfering with the sensitivity of the scale arrangement. The arrangement of the wheels on their flexible shafts at opposite sides of the axis of the disc also insures a well-balanced arrangement and one in which the differential speed between the wheels is in effect the sum of the changes in speed of the two wheels and such that the effect of inaccuracies in the change of the speed of either one will be minimized.

Under certain conditions, it has been found desirable to limit the degree of skewing of the wheels as, for example, when the device is not in use, and the disc is not rotating, should a substantial change in load occur when a workman accidentally steps on the scale platform, the wheels may be skewed or tilted on the disc sufficiently to cause damage to various parts. Furthermore, while the device is operating and the disc rotating, it is desirable that the degree of skewing or tilt of the wheels in response to load changes be limited to an extent sufficient for the disc to move the wheels radially thereof. Any additional tilting of the wheels will result in further unnecessary bending of the flexible spring shafts, and it is possible that this further bending of the spring shafts may cause distortion thereof which may render the device as a whole inaccurate in use.

The structure shown in Figs. 6–10 of the drawings is intended to accomplish the above object while, at the same time, permitting free movement of the lever displaced by the scale beam in order that its function of controlling the positioning of the wheels on the disc will not be disturbed. It will be understood, however, that since the two wheels of the integrating device described above are tied together, it is necessary only to provide skew limiting means for one wheel.

Figure 6:
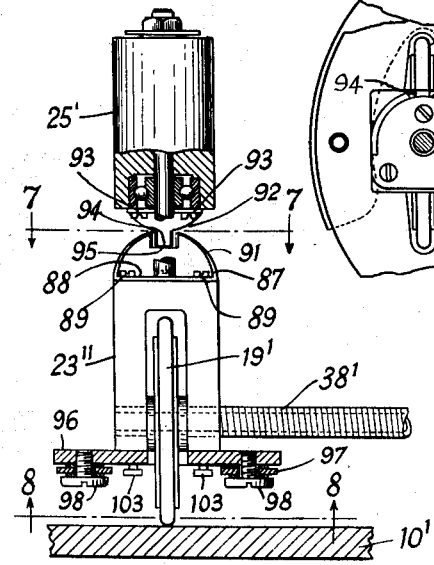
Fig. 6 is a vertical sectional view showing the structural details of a limiting device adapted for use with the invention.

Referring particularly to Fig. 6, 19' indicates one of the wheels which frictionally engages the disc 10' and is journaled for rotation within yoke 23". The flexible shaft rotatable with wheel 19' is indicated at 38'. In order to limit the tilt or degree of skewing of the wheel 19', I have found it convenient to provide a casting 87 having a flat surface 88, firmly secured to the top surface of the wheel yoke 23" as by the screws 89, and a rounded vertically disposed portion 91. A similar casting 92 is secured to the underside of spindle housing 25' as by screws 93, this latter casting being provided with a depending nub 94 positioned within an elongated recess 95 formed in the rounded upper edge of the vertical portion 91 of casting 87. Thus, as wheel 19' is skewed or tilted in either direction, the vertical portion 91 of casting 87 moves therewith such that one side of the recess 95 formed therein moves toward the nub 94, and upon engagement therewith, further skewing of the wheel is prevented. By test, I have found that a tilt of substantially 8° is sufficient to allow the wheel to be repositioned on the disc, under the rotative influence thereof, and the distance between the sides of recess 95 may be gauged to permit 8° tilting of the wheel. Should it be desired to permit the wheel to tilt beyond the 8°, it is only necessary to enlarge the width of the recess.

As pointed out above, however, the skewing of the wheels is produced by the skewing movement of lever 65' which is pivotally secured to lever 67, Fig. 1, of the scale beam, the function of lever 65' being to predetermine the proper repositioning of the wheels on the disc in response to load changes. Therefore, it is necessary that lever 65' be free to tilt or skew through an arc corresponding to load changes. To accomplish this, I have provided a supplemental yoke member 96, Fig. 8, which is loosely secured to the yoke portion 97 of lever 65' as by screws 98 respectively disposed within a series of elongated slots indicated at 99, 101 and 102, the supplementary yoke being rigidly secured to the wheel yoke 23" as by screws 103. Coil springs 104 and 105 interconnect the supplemental yoke 96 and yoke portion 97 of lever 65' and serve to maintain the yokes in alignment until the wheel has reached its maximum skewing point.

Figure 8:
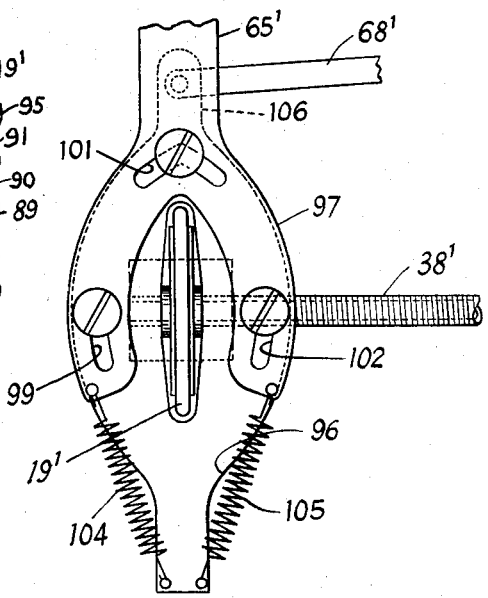
Fig. 8 is a view taken along the line and in the direction of the arrows at 8—8 of Fig. 6.
Figure 9:
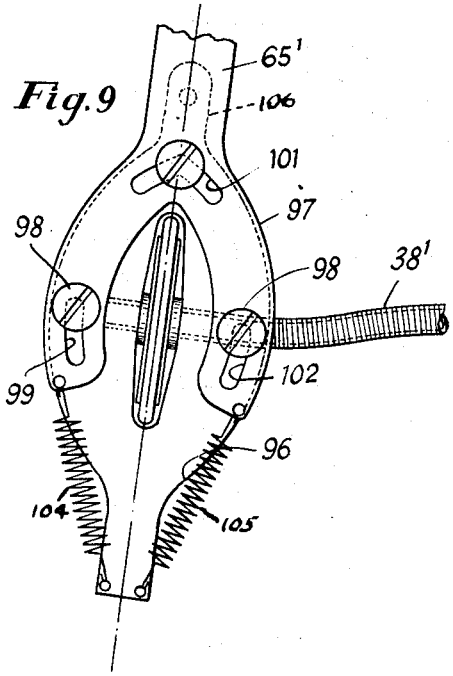
Fig. 9 is a view similar to that of Fig. 8 showing the operating lever for the device positioned at the maximum skew angle of the wheel.
Figure 10:
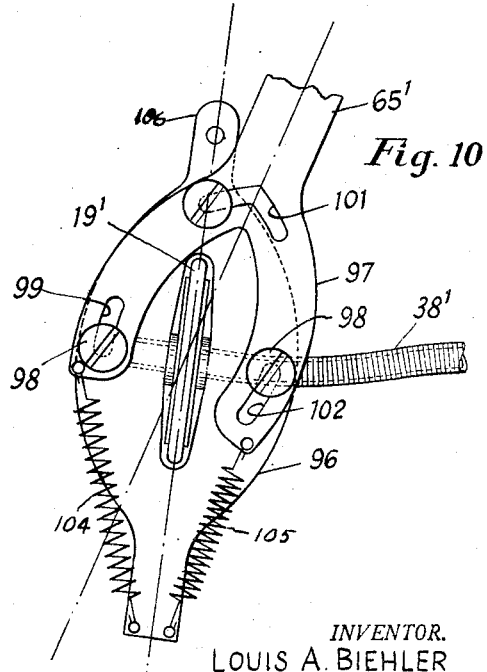
Fig. 10 is a view similar to Fig. 9 showing the lever moved to a position beyond the maximum skew angle of the wheel.

The operation of this structure can best be seen from a consideration of Figs. 9 and 10 of the drawings, wherein Fig. 9 shows the wheel 19' positioned at its maximum tilting point, in which position, yokes 96 and 97 are maintained in alignment, with screws 98, loosely securing the yokes together, also being maintained in their original position, shown in Fig. 8. However, as the lever 65' continues its skewing motion in response to a load change on the conveyor belt, it assumes the position shown in Fig. 10, wherein the yoke portion of the lever is moved out of alignment with the supplemental yoke, the movement being facilitated by movement of the screws 98 within their respective slots. It will be noted from Fig. 10 that coil spring 104 becomes distended while spring 105 is slightly compressed, thus, movement of the lever 65' beyond a position corresponding to the limit of skewing of the wheels is taken up by the coil springs.

Should the skewing of the wheel and lever 65' occur in a direction opposite to that shown in Figs. 9 and 10, the skewing of the wheel will, of course, be arrested after it has traveled, for example, 8° from its original position, while the lever may continue its skewing movement with screws 98 sliding into engagement with the opposite ends of their respective slots. It will be noted, however, that as the lever is skewed in the direction shown in Figs. 9 and 10, the movement is about the screw located in slot 102 such that upon this movement, the position of the screw within its slot remains unchanged. Similarly, when the lever is tilted in the reverse direction, the movement will be about the screw located in slot 99 such that the screw will not slide therewithin. It further should be noted that the length of the slots is such as to permit as great a movement of the lever 65' as may be produced by lever 67 pivotally secured thereto and movable within the elongated opening 71 in the housing 69, Fig. 1. Stated another way, the length of the slots 99, 101 and 102 corresponds to the length of slot 71 in housing 69 such that lever 65' may be free to move to a new position corresponding with a maximum deflection of lever 67 in response to load changes.

Although as pointed out above, it only is necessary to construct stop means for one of the two integrator wheels since they are tied together by means of the connecting link 68, Fig. 2, it can be appreciated that to render the above-described structure operable with a two wheel integrator, this connecting link may not be secured to the lever 65', otherwise the wheel at which the stop means are constructed would be limited in its skewing movement while the other wheel would follow the full skewing movement of lever 65'. Therefore, I find it desirable to provide an extended portion 106 on the supplemental yoke 96 to which the connecting link indicated at 68', Fig. 8, may be secured. Thus, as wheel 19' is arrested by the nub 94 and recess 95, which serve as stop means, the movement of the supplemental yoke 96 is also arrested and connecting link 68' will cause the other wheel, to which it is connected, to follow the movement of wheel 19'.

While the invention has been particularly described in connection with apparatus for weighing materials on a moving conveyor belt, it will be understood that the arrangement may be used for various other integrating purposes, the disc being rotated at a speed in proportion to one of the factors to be measured, while the lever arm 65 is moved in accordance with the other factor. If desired, the output of the differential may be connected as by an extended shaft 86, Fig. 3, for example, to suitable apparatus (not shown) for controlling either additional indicating means, or, for example, means for varying or controlling one of the factors being integrated, etc.

What is claimed as new and desired to be secured by Letters Patent of the United States is:

1. In an integrating mechanism, the combination comprising a rotatable disc, means for rotating same at speeds variable in proportion to changes in value of one quantity to be integrated, a pair of wheels frictionally engaging said disc on opposite sides of its axis of rotation and normally equally distant from said axis, whereby the wheels are caused to rotate in opposite directions normally at the same speed by the rotation of said disc, a carriage assembly disposed above said disc, bearing supports for said wheels rotatably mounted on said carriage to permit skewing of the wheels, lever means connected to one of said bearing supports and movable responsive to changes in another quantity to be integrated, rotary motion reversing link means interconnecting said supports to cause the wheels to become oppositely skewed on the disc to promote movement of the wheels and carriage over the disc in response to changes in said last-mentioned quantity, means including differential gearing mounted on said carriage assembly, and a pair of flexible shafts respectively interconnecting said wheels and said differential gearing to drive such gearing responsive to relative differences between the speeds of the wheels.

2. In an integrating mechanism, the combination comprising a rotatable disc, means for rotating same at speeds variable in proportion to changes in value of one quantity to be integrated, a wheel frictionally engaging said disc and rotated thereby, a bearing support for said wheel rotatably mounted to permit skewing of the wheel, carriage means for said bearing support permitting movement of said support with the carriage generally radially of the disc responsive to such skewing of the wheel, means connected to said bearing support for turning same on its mounting to skew the wheel responsive to changes in another quantity to be integrated, a shaft flexible in transverse directions and connected at one end to be driven by said wheel, and speed measuring means supported at least in part on said carriage and driven by the other end of said shaft.

3. In an integrating mechanism, the combination comprising a rotatable disc, means for rotating same at speeds variable in proportion to changes in value of one quantity to be integrated, a wheel frictionally engaging said disc and rotated thereby, a bearing support for said wheel rotatably mounted about an axis substantially perpendicular to the disc to permit skewing of the wheel, carriage means for said bearing support permitting movement of said support with the carriage generally radially of the disc responsive to such skewing of the wheel, means connected to said bearing support for turning same on its mounting to skew the wheel responsive to changes in another quantity to be integrated, a coil spring forming a flexible shaft connected at one end to be driven by said wheel, and indicating means driven from the other end of said shaft.

4. In an integrating mechanism, the combination comprising a rotatable disc, means for rotating same at speeds variable in proportion to changes in value of one quantity to be integrated, a wheel frictionally engaging said disc and rotated thereby, a bearing support for said wheel rotatably mounted to permit skewing of the wheel, spring means for urging said bearing support and wheel toward the disc, carriage means for said bearing support permitting movement of the wheel with the carriage along the surface of the disc responsive to such skewing of the wheel, means connected to said bearing support for turning same about its mounting to skew the wheel responsive to changes in another quantity to be integrated, a shaft flexible in transverse directions and connected at one end to be driven by said wheel, and indicating means driven by the other end of said shaft.

5. In mechanism for integrating two quantities the combination of parts comprising a disc adapted to be rotated at a speed proportional to the value of one quantity to be integrated, a wheel frictionally engaging said disc at one side of the axis of rotation thereof, whereby the wheel is caused to rotate by the disc, speed measuring means operatively connected to said wheel, lever means movable to different positions responsive to changes in another quantity to be integrated for skewing said wheel on the disc, whereby the wheel may be moved under the rotative influence of the disc to different positions thereon, stop means for limiting the degree of skew of said wheel upon excessive changes in said other quantity to be integrated, and said lever means including connecting portions which are yieldable after said stop means becomes effective, to permit further movement of the lever responsive to such excessive changes.

6. In an integrating mechanism, the combination comprising a rotatable disc, means for rotating same at speeds variable in proportion to changes in value of one quantity to be integrated, a pair of wheels frictionally engaging said disc on opposite sides of its axis of rotation, a carriage assembly disposed above said disc, bearing supports for said wheels rotatably mounted on said carriage to permit skewing of the wheels, lever means connected to one of said bearing supports and movable responsive to changes in another quantity to be integrated, rotary motion reversing link means interconnecting said supports to cause the wheels to become oppositely skewed on the disc to promote movement of the wheels and carriage over the disc in response to changes in said last-mentioned quantity, coil springs forming flexible shafts respectively connected at one end to be driven by said wheels, and indicating means driven by the other ends of said shafts.

LOUIS A. BIEHLER.

REFERENCES CITED

The following references are of record in the file of this patent:

UNITED STATES PATENTS

| Number | Name | Date |
|---|---|---|
| 707,340 | Medina | Aug. 19, 1902 |
| 732,386 | Wantz | June 30, 1903 |
| 1,072,500 | Richardson | Sept. 9, 1913 |
| 1,386,953 | Robertson | Aug. 9, 1921 |
| 1,406,665 | Ljungstrom | Feb. 14, 1922 |
| 1,559,073 | Gherassimoff | Oct. 27, 1925 |
| 2,218,434 | Neuhaus | Oct. 15, 1940 |
| 2,285,675 | Merrick | June 9, 1942 |

FOREIGN PATENTS

| Number | Country | Date |
|---|---|---|
| 5,937 | Great Britain | Mar. 17, 1908 |
| 588,294 | France | Jan. 29, 1925 |